United States Patent [19]
Michel et al.

[11] 3,777,609
[45] Dec. 11, 1973

[54] DEVICE FOR TRIMMING THE BOTTOM OF HOLLOW PLASTIC BODIES PRODUCED BY BLOW MOLDING

[75] Inventors: Edmond Michel, Brussels; Maurice Minsart, Namur, both of Belgium

[73] Assignee: Solway & Cie, Brussels, Belgium

[22] Filed: Mar. 2, 1972

[21] Appl. No.: 231,113

[30] Foreign Application Priority Data
Mar. 3, 1971  Belgium .............................. 100414

[52] U.S. Cl.................. 83/635, 83/638, 83/694, 83/542, 83/914, 425/302 B, 425/305 B
[51] Int. Cl............................ B26d 5/16, B26d 1/06
[58] Field of Search................... 83/627, 630, 632, 83/633, 635, 638, 694, 337, 542, 914; 425/302 B, 305 B

[56] References Cited
UNITED STATES PATENTS

| | | | |
|---|---|---|---|
| 3,464,084 | 9/1969 | Thompson | 83/914 X |
| 3,545,327 | 12/1970 | Dorman | 83/542 |
| 3,069,722 | 12/1962 | Kato | 425/302 B |
| 3,632,262 | 1/1972 | Johnston | 425/302 B |

*Primary Examiner*—Willie G. Abercrombie
*Attorney*—George H. Spencer et al.

[57] ABSTRACT

In a blow molding machine, a trimming device for trimming the bottom of hollow plastic bodies after they have been fabricated by extrusion blow molding, including a movable flexible blade, a mechanism for effecting a periodic displacement of the blade and a slide guide which guides the blade during its displacements.

9 Claims, 5 Drawing Figures

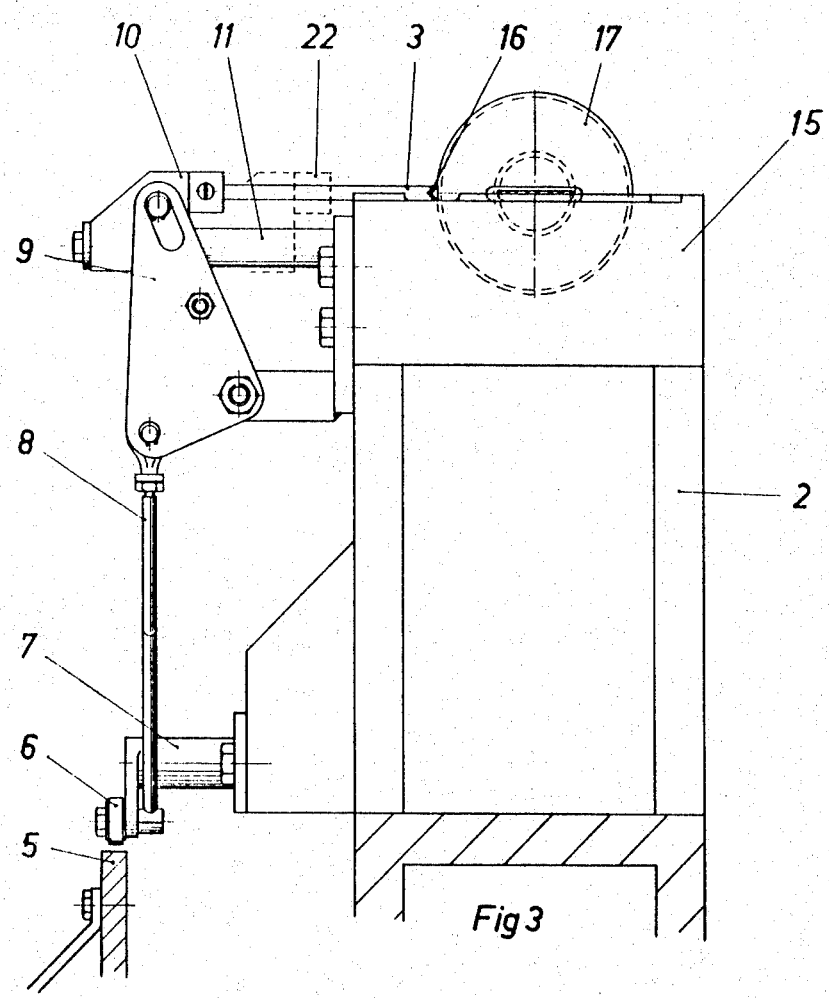

DEVICE FOR TRIMMING THE BOTTOM OF HOLLOW PLASTIC BODIES PRODUCED BY BLOW MOLDING

BACKGROUND OF THE INVENTION

The present invention relates to molding machines, and more particularly to a device for trimming the bottom of hollow plastic bodies during their production by blow molding.

The majority of installations for molding hollow bodies such as bottles, of plastic material, which utilize this technique result in the production of hollow bodies on the bottoms of which a flash is formed by the pinching of the leading end of the parison by the bottoms of the mold halves. Because this flash must be removed by a subsequent manual or mechanical operation, the production costs for forming such bodies are increased.

In order to overcome this shortcoming, it has previously been proposed to equip the hollow body molding installations with devices enabling the flash to be removed during the molding cycle.

Nevertheless, the various devices proposed to date for achieving this are unsatisfactory in many respects. Some of these devices are dimensionally large, others are difficult to produce, while still others are only capable of treating hollow bodies having flat bottoms.

SUMMARY OF THE INVENTION

It is, therefore, an object of the present invention to provide a molding machine in which hollow plastic bodies are produced in a mold with the bottom of the molded body being trimmed by a trimming device which overcomes the disadvantages of known devices.

It is a related object of the present invention to provide a trimming device for a molding machine in which a movable flexible blade is guided during a periodic displacement of the blade along a closing line of the mold bottom.

These and other objects are accomplished by the present invention by the provision of a trimming device for trimming the bottoms of hollow plastic bodies during their production by extrusion blow molding. The device comprises a movable flexible blade, means for effecting a periodic displacement of the blade along a closing line of the mold bottom, and a slide guide guiding the blade along the closing line of the mold bottom.

The slide guide has a cavity formed therein which guides the movable flexible blade. The cavity is preferably composed of suitable grooves cut in the bottoms of the mold halves constituting the blow mold. These grooves match the profile of the bottom of the hollow body to be treated. The cavity may be completed by at least one metal guide which is fixed on the bottom of at least one of the mold halves and which applies the blade against the bottom of the mold.

The blade is made of a metal having good elasticity, such as for example steel. In order to reduce the stresses acting on this blade, and consequently its wear, it is advantageous to construct the blade to have a curvature intermediate between that of the bottom of the mold and that of its trajectory outside the cavity.

The means effecting the periodic displacement of the blade may take a variety of forms and may be operated mechanically, for example by a cam, pneumatically, hydraulically, or electrically. During the trimming operation theae means may apply either a pushing force or a pulling force to the flexible blade.

In the first case the blade is retracted from the mold when at rest and trimming of the molded body is effected, after the mold is closed, by the leading edge of the blade during its displacement.

In the second case the blade in its rest position matches the shape of the bottom of the hollow body and trimming of the molded body is effected by pulling the blade along the closing line of the mold bottom. In this case the blade preferably has a central cutout situated at the point where the parison is pinched by the bottom of the mold halves, and the flash is cut off by the cutting edge of this cutout.

In addition, in order to retain the blade in the cavity provided in one of the mold halves on opening of the mold, a retaining means, such as a bead, which engages in one of the grooves in one of the mold halves may be provided on the blade. In order to retain the flexibility of the blade in this case, this bead may optionally be notched.

The present invention provides a very simple device which enables the trimming operation to be carried out in a very effective manner during the molding cycle. Moreover, the device according to the present invention permits the trimming of hollow bodies with flat bottoms and also hollow bodies which do not have flat bottoms, for example hollow bodies having a recessed bottom.

Furthermore, the device according to the invention is very small in size and can, for example, be used to advantage in rotary molding machines equipped with practically contiguous molds.

The trimming device according to the invention is described in greater detail below with reference to two preferred practical embodiments. It is, however, quite obvious that this description, which is given purely by way of illustration, does not in any way limit the scope of the present invention, to which numerous modifications of detail may be made if these do not depart either from its scope or from its spirit. Thus, for example, in the description given below the trimming devices are used in a rotary molding machine provided with contiguous molds in order to emphasize their small dimensions, but it is quite obvious that the same trimming devices could be used in other types of hollow body molding machines.

BRIEF DESCRIPTION OF THE DRAWINGS

FIG. 3 is a view in elevation of the machine shown in FIG. 1.

DESCRIPTION OF THE PREFERRED EMBODIMENTS

Figure 1:
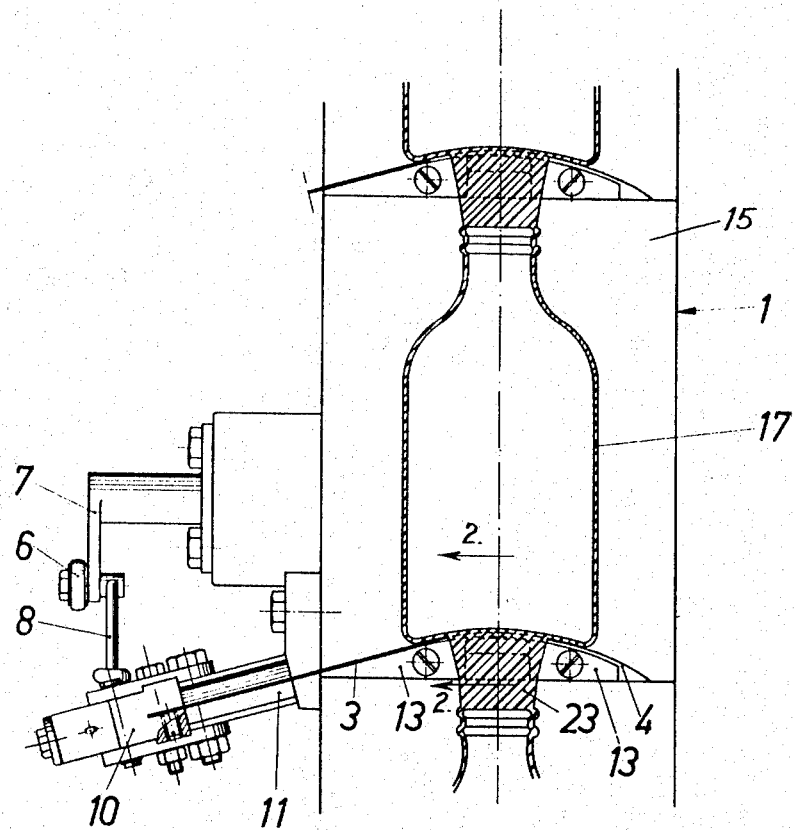
FIG. 1 is a partial top plan view of a rotary hollow body molding machine equipped with a trimming device of the pushed blade type according to the invention.

In the various accompanying drawings, only those elements of the machines necessary for an understanding of the trimming devices have been shown in detail, in order not to sacrifice clarity.

As will be seen from the drawings, the molding machine is composed of a series of molds 1 constituted by halves 14 and 15 and mounted practically contiguously on a rotary support 2. The molds 1 are so designed as to receive a continuous parison supplied by an extruding machine (not shown) and to convert this parison into a hollow body 17 by blow molding.

Figure 2:
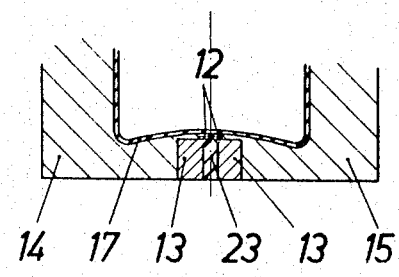
FIG. 2 is a partial cross-sectional view taken along the line 2—2 of FIG. 1.

The bottom trimming device illustrated in FIGS. 1 to 3 is composed of a movable flexible steel blade 3, a mechanism described hereinbelow for effecting a periodic displacement of the blade, and a recess 4 forming a slide guide and effecting the guiding of the blade during its movements along the bottom.

It should be understood that although a single trimming device is illustrated, a complete machine includes a plurality of such devices each permanently associated with a respective mold.

The mechanism effecting the displacement of the blade 3 for the trimming operation is composed of a fixed cam 5 of suitable profile which is fastened to the fixed frame of the molding machine and disposed in the trajectory of a driving roller 6. The driving roller 6 is connected by a system of levers 7, 8 and 9 to a support 10 for the blade 3. The support 10 is adapted to slide on a rod 11 fastened to one of the mold halves 14.

The recess 4, which effects the guiding of the blade 3 during its movements, matches the shape of the bottom of the hollow body 17 to be trimmed. The recess 4 is composed of grooves 12 cut in the bottoms of the mold halves 14 and 15 constituting each blow mold. The recess 4 is completed by metallic guides 13 fixed on the bottom of each mold half. It should be noted that a single metal guide 13 mounted on the mold half equipped with the trimming device may be sufficient to ensure good operation of the latter.

The leading end 16 of the flexible blade 3 is bevelled so as to be able to ensure a clean cutting of the flash 23 to be removed.

Figure 5:
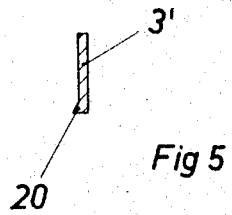
FIG. 5 is a sectional view of a trimming blade used in the machine illustrated in FIG. 4.
Figure 4:
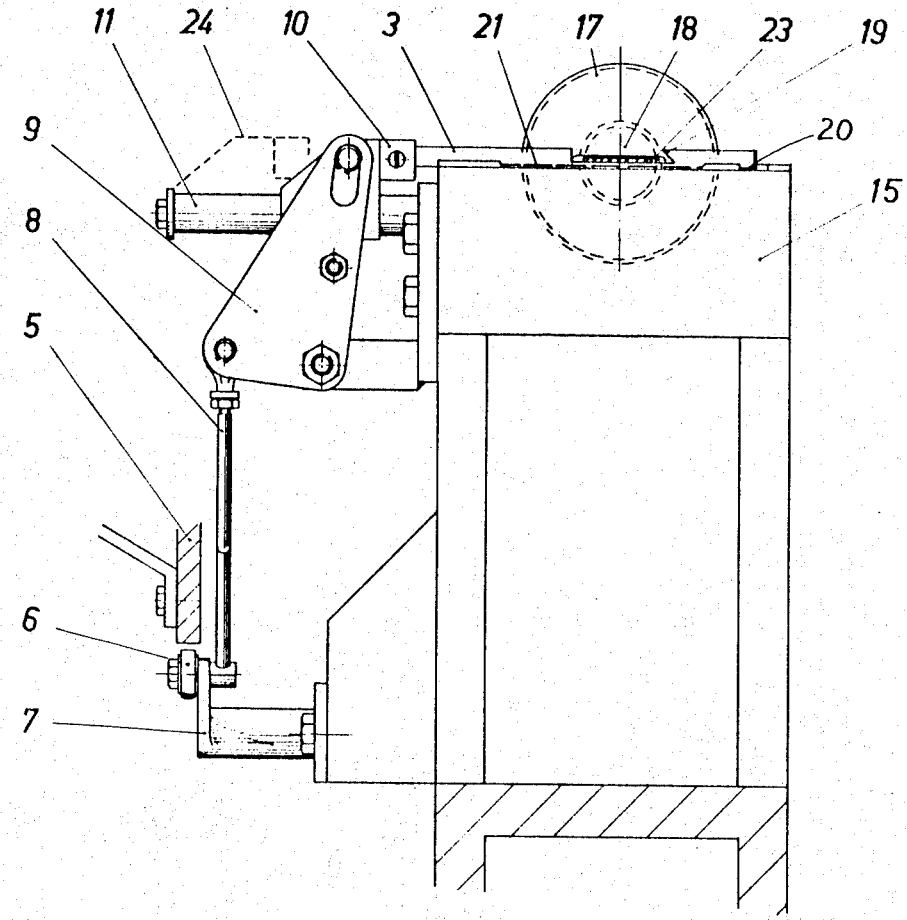
FIG. 4 is a view in elevation of a rotary machine similar to that shown in FIG. 1 and equipped with a trimming device of the pulled blade type according to the invention.

The trimming device illustrated in FIGS. 4 and 5 is similar to that which has just been described, except that the position of the control cam 5 is reversed and the blade 3' has a central cutout 18 the edge of which is a cutting edge, and a bead 20 having notches 21.

The operation of the trimming devices which have just been described is very simple and can easily be deduced from examination of the accompanying drawings. Thus, referring to FIGS. 1 to 3, the operation of the first device described is as follows:

After the mold 1 has been closed and the portion of parison contained in it has been blow molded to form the desired hollow body 17, the driving roller 6 encounters the fixed cam 5, the profile of which is such that the roller 6 is moved upwardly to initiate the cutting stroke. With the aid of the system of levers 7, 8 and 9 the upward movement of the roller 6 results in a displacement towards the right, in the planes of FIGS. 1 and 3, of the support 10 on the rod 11. The support 10 occupies at the end of its stroke the position diagrammatically indicated by the broken lines 22. During this displacement, the blade 3 is moved into the recess 4. As a result, the leading end 16 cuts the bottom flash 23 level with the bottom of the hollow body 17. The blade 3 is then returned to the starting position by the reverse or return stroke of the support 10. The reverse stroke of the support 10 results from the action of a second fixed cam (not shown) which moves the driving roller 6 down-wards again.

The operation of the second device described is, with reference to FIGS. 4 and 5, as follows:

After the mold has been closed and the portion of the parison contained therein has been blow molded to form the desired hollow body 17, the driving roller 6 encounters the fixed cam 5 the profile of which is such that the roller 6 is moved downwardly to initiate the cutting stroke. With the aid of the system of levers 7, 8 and 9, the downward movement of the roller 6 results in a displacement towards the left in the plane of FIG. 4 of the support 10 on the rod 11. The support 10 occupies at the end of its movement the position diagrammatically shown by the broken lines 24. During this movement the blade 3' is pulled towards the left in the recess 4 and the cutting edge 19 of its central cutout 18 cuts the flash 23 level with the bottom of the hollow body 17.

The blade 3' is then returned to the starting position by the reverse or return stroke of the support 10. The reverse stroke of the support 10 results from the action of a second fixed cam (not shown), which moves the driving roller 6 upwards again. During the return movement, which takes place after the mold has been opened and the trimmed hollow body 17 ejected, the blade 3' is held in the recess in the mold half 14 through the action of its retaining bead 20.

It is clear, therefore, that the system of controlling the blade may be modified without thereby departing from the scope of the present invention. Thus, for example, the blade may be directly fixed to the piston of a double action pneumatic or other ram controlled by a programmer or by any other means.

We claim:

1. A device for trimming the bottom of hollow plastic bodies during their production in a mold by blow molding, the mold being constituted by mold halves, comprising: a movable flexible blade; means for effecting a periodic displacement of said blade along the closing line of the bottom of the mold; and slide guide means guiding said blade along the closing line of the bottom of the mold during its displacements, said slide guide means being constituted by grooves cut in the bottoms of the mold halves constituting the blow mold.

2. A device according to claim 1 wherein said means provided for effecting the periodic displacement of said movable blade applies a thrust to said blade during the trimming operation.

3. A device according to claim 1 wherein said means provided for effecting the periodic displacement of said movable blade applies traction to said blade during the trimming operation.

4. A device according to claim 3 wherein said blade is provided with means which hold it in the slide guide means.

5. A device according to claim 4 wherein said blade is provided with a bead.

6. A device according to claim 5 wherein the retaining bead is notched.

7. A device according to claim 1 wherein said slide guide means is completed by at least one metal guide fixed on the bottom of at least one of the mold halves.

8. A device according to claim 3 wherein said blade has a central cutout.

9. In a machine for molding hollow plastic bodies, the improvement comprising at least one trimming device for trimming the bottom of the hollow plastic bodies during their production in a mold by blow molding, the mold being constituted by mold halves and said trimming device including: a movable flexible blade; means for effecting a periodic displacement of said blade along the closing line of the bottom of the mold; and slide guide means guiding said blade along the closing line of the bottom of the mold during its displacements, said slide guide means being constituted by grooves cut in the bottoms of the mold halves constituting the blow mold.

* * * * *

UNITED STATES PATENT OFFICE
CERTIFICATE OF CORRECTION

Patent No. 3,777,609          Dated December 11th, 1973

Inventor(s) Edmond Michel and Maurice Minsart

It is certified that error appears in the above-identified patent and that said Letters Patent are hereby corrected as shown below:

In the heading of the patent, line 6, change "Solway" to --Solvay--.

Signed and sealed this 16th day of April 1974.

(SEAL)
Attest:

EDWARD M. FLETCHER, JR.
Attesting Officer

C. MARSHALL DANN
Commissioner of Patents